US012643309B2

(12) United States Patent
Benjamin et al.

(10) Patent No.: US 12,643,309 B2
(45) Date of Patent: Jun. 2, 2026

(54) METHOD AND SYSTEM FOR LAMINATING AND DYNAMICALLY AND REVERSIBLY BENDING COVER GLASS

(71) Applicant: Corning Incorporated, Corning, NY (US)

(72) Inventors: Jeffrey Michael Benjamin, Horseheads, NY (US); Wesley J Buth, Corning, NY (US); Scott Steven Cronk, Webster, NY (US); Atul Kumar, Horseheads, NY (US); Khaled Layouni, Fontainebleau (FR); Jason Scott Stewart, Hornell, NY (US); Po Ki Yuen, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 71 days.

(21) Appl. No.: 17/611,814

(22) PCT Filed: May 12, 2020

(86) PCT No.: PCT/US2020/032427
§ 371 (c)(1),
(2) Date: Nov. 16, 2021

(87) PCT Pub. No.: WO2020/236457
PCT Pub. Date: Nov. 26, 2020

(65) Prior Publication Data
US 2022/0234447 A1 Jul. 28, 2022

Related U.S. Application Data

(60) Provisional application No. 62/850,090, filed on May 20, 2019.

(51) Int. Cl.
*B32B 17/06* (2006.01)
*B32B 3/08* (2006.01)
(Continued)

(52) U.S. Cl.
CPC .............. *B32B 17/06* (2013.01); *B32B 3/085* (2013.01); *B32B 7/14* (2013.01); *B32B 37/1292* (2013.01);
(Continued)

(58) Field of Classification Search
None
See application file for complete search history.

(56) References Cited

U.S. PATENT DOCUMENTS 5,373,139 A * 12/1994 Burgoon .............. B23K 9/0213
219/136
5,559,760 A * 9/1996 Schneider .............. G04R 60/10
368/278

(Continued)

FOREIGN PATENT DOCUMENTS

CN 101684032 A 3/2010
DE 19782261 T1 2/2000
(Continued)

OTHER PUBLICATIONS

DE 10 2016 215546 A1; English machine translation (see FOR doc above) (Year: 2018).*
(Continued)

*Primary Examiner* — Frank J Vineis
*Assistant Examiner* — Nicole T Gugliotta
(74) *Attorney, Agent, or Firm* — Daniel J. Greenhalgh

(57) ABSTRACT
A vehicle interior system having a first frame having a first end and a second end and a second frame having a third end and a fourth end. The third end of the second frame is arranged proximal to the second end of the first frame, and the first frame and the second frame define a bending axis between the second end and the third end. A continuous cover material is bonded to the first and second frame and across the bending axis. The vehicle interior system also
(Continued)

includes a first display device positioned in a first aperture of the first frame. The system has a first configuration in which the first frame is planar with the second frame and a second configuration in which the first frame is not planar with the second frame. The system is configured to reversibly transition between the first and second configurations.

16 Claims, 4 Drawing Sheets

(51) Int. Cl.

| | |
|---|---|
| *B32B 7/12* | (2006.01) |
| *B32B 7/14* | (2006.01) |
| *B32B 37/12* | (2006.01) |
| *B32B 37/18* | (2006.01) |
| *B32B 38/18* | (2006.01) |
| *B60K 35/22* | (2024.01) |
| *B60K 35/50* | (2024.01) |
| *B60K 37/00* | (2024.01) |

(52) U.S. Cl.

CPC .......... *B32B 37/18* (2013.01); *B32B 38/1833* (2013.01); *B60K 35/22* (2024.01); *B60K 35/50* (2024.01); *B60K 37/00* (2013.01); *B32B 2305/34* (2013.01); *B32B 2307/54* (2013.01); *B32B 2307/732* (2013.01); *B32B 2315/08* (2013.01); *B32B 2457/20* (2013.01); *B32B 2605/003* (2013.01); *B32B 2605/08* (2013.01); *B60K 2360/688* (2024.01); *B60K 2360/693* (2024.01)

(56) References Cited

U.S. PATENT DOCUMENTS

| | | | | |
|---|---|---|---|---|
| 5,668,570 | A * | 9/1997 | Ditzik ................... | G06F 1/1632 |
| | | | | 345/905 |
| 5,734,513 | A * | 3/1998 | Wang ................... | G02B 25/002 |
| | | | | 345/32 |
| 6,377,324 | B1 | 4/2002 | Katsura | |
| 2012/0200991 | A1 * | 8/2012 | Ryu ....................... | G06F 1/1601 |
| | | | | 361/679.01 |
| 2013/0169590 | A1 * | 7/2013 | Wickboldt ............. | G02B 1/105 |
| | | | | 345/174 |
| 2014/0098075 | A1 * | 4/2014 | Kwak ................... | G09G 3/2003 |
| | | | | 345/204 |
| 2016/0297176 | A1 | 10/2016 | Rickerl | |
| 2016/0377909 | A1 * | 12/2016 | Kondoh ............ | G02F 1/133308 |
| | | | | 349/58 |
| 2017/0197561 | A1 | 7/2017 | Mcfarland | |
| 2018/0050948 | A1 * | 2/2018 | Faik .................... | C03B 23/0066 |
| 2018/0136371 | A1 * | 5/2018 | Kim .......................... | B32B 7/12 |
| 2020/0236801 | A1 * | 7/2020 | Jan .......................... | F16H 21/44 |

FOREIGN PATENT DOCUMENTS

| | | | | |
|---|---|---|---|---|
| DE | 102014016323 | A1 | 5/2016 | |
| DE | 10 2016 215546 | A1 * | 2/2018 ............... | B32B 3/14 |
| JP | 2003-321257 | A | 11/2003 | |
| JP | 2004-284839 | A | 10/2004 | |
| JP | 2013-188993 | A | 9/2013 | |
| WO | 2018/005646 | A1 | 1/2018 | |

OTHER PUBLICATIONS

Belis et al., "Cold bending of laminated glass panels", Heron, 2007, vol. 52, pp. 123-146.

Galuppi et al., "Optimal cold bending of laminated glass", International Journal of Solids and Structures, vol. 67-68, 2016, pp. 231-243.

Overend et al., "Behaviour of cold bent glass plates during the shaping process", Engineered Transparency. International Conference at glasstec, Dusseldorf, Germany, Oct. 21 and 22, 2014, 9 pages.

International Search Report and Written Opinion of the International Searching Authority; PCT/US20/32427; Mailed Aug. 4, 2020; 10 Pages; European Patent Office.

* cited by examiner

METHOD AND SYSTEM FOR LAMINATING AND DYNAMICALLY AND REVERSIBLY BENDING COVER GLASS

CROSS-REFERENCE TO RELATED APPLICATIONS

This application claims the benefit of priority under 35 U.S.C. § 371 of International Application No. PCT/US2020/032427, filed on May 12, 2020, which claims the benefit of priority under 35 U.S.C. § 119 of U.S. Provisional Application Ser. No. 62/850,090 filed on May 20, 2019 the content of which are relied upon and incorporated herein by reference in their entirety.

BACKGROUND

The disclosure relates to vehicle interior systems, and more particularly to vehicle interior systems configured to transition between a planar configuration and a non-planar configuration.

Vehicle interiors include curved surfaces and can incorporate displays in such curved surfaces. The materials used to form such curved surfaces are typically limited to polymers, which do not exhibit the durability and optical performance as glass. As such, curved glass substrates are desirable, especially when used as covers for displays. Existing methods of forming such curved glass substrates, such as hot forming, have drawbacks including high cost, optical distortion, and surface marking. Further, existing cold forming techniques require a mechanical force to hold a cold-bent glass article in place until an adhesive cures to sufficient strength to maintain the glass in the bent shape. Moreover, in both methods, the curvature of the glass is fixed such that there is no possibility to reversibly bend, flatten, and re-bend the glass.

SUMMARY

According to an aspect, embodiments of the disclosure relate to a vehicle interior system. The vehicle interior system includes a first frame having a first end and a second end and a second frame having a third end and a fourth end. The third end of the second frame is arranged proximal to the second end of the first frame, and the first frame and the second frame define a bending axis between the second end and the third end. A continuous cover material is bonded to the first and second frame and across the bending axis. The vehicle interior system also includes a first display device positioned in a first aperture of the first frame. The system has a first configuration in which the first frame is planar with the second frame and a second configuration in which the first frame is not planar with the second frame. The system is configured to reversibly transition between the first and second configurations.

According to another aspect, embodiments of the disclosure relate to a vehicle interior system. The vehicle interior system includes a first frame having a first end and a second end and a second frame having a third end and a fourth end. The third end of the second frame is arranged proximal to the second end of the first frame and wherein the first frame and the second frame define a bending axis between the second end and the third end. The vehicle interior system also includes a continuous cover glass bonded to the first frame and to the second frame and across the bending axis. The vehicle interior system has a first configuration in which the first frame is substantially planar with the second frame and a second configuration in which the first frame is not substantially planar with the second frame. The vehicle interior system is configured to reversibly transition between the first configuration and the second configuration.

According to still another aspect, embodiments of the disclosure relate to A method of assembling a vehicle interior system. In the method, a first frame is aligned with a second frame in a planar configuration. A bending axis is formed between the first frame and the second frame. A first adhesive is applied to at least end regions of the first and second frames. A continuous cover material is laminated to the first and second frames and over the bending axis while the frame is in the planar configuration.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification.

BRIEF DESCRIPTION OF THE DRAWINGS

The accompanying drawings incorporated in and forming a part of the specification illustrate several aspects of the present invention and, together with the description, serve to explain the principles of the invention. In the drawings.

DETAILED DESCRIPTION

Reference will now be made in detail to various embodiments, examples of which are illustrated in the accompanying drawings. Conventionally, a vehicle interior system may include a variety of different flat or curved surfaces but not surfaces that can transition between flat and curved. Embodiments of the present disclosure provide vehicle interior systems having a cover material bonded to a frame that is dynamically bendable between planar and non-planar configurations. In particular, the vehicle interior systems include two frame sections that define a bending axis and a cover material that is bonded to and extends across both frames, including across the bending axis. In embodiments, the frames may be driven by actuator arms to move the frames between a planar configuration and a non-planar configuration. Further, in embodiments, the vehicle interior systems may include displays, and the dynamic bending of the system allows for the display to be angled toward the driver so as to enhance the visibility of the display. Additionally, non-display systems can be incorporated into other structures of a vehicle, such as storage compartments. These and other embodiments of the vehicle interior system are described hereinbelow, and the following discussion is intended to be illustrative and not limiting.

Figure 1:
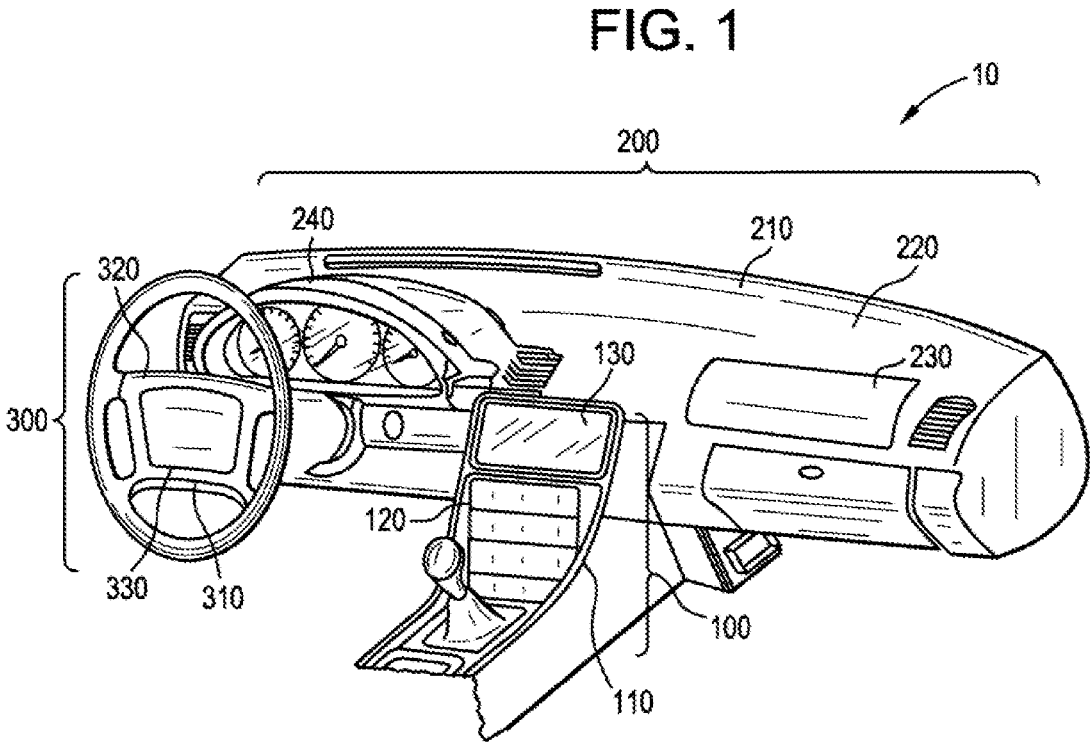
FIG. 1 is a perspective view of a vehicle interior with vehicle interior systems, according to exemplary embodiments.

FIG. 1 shows an exemplary vehicle interior 10 that includes three different embodiments of a vehicle interior system 100, 200, 300. Vehicle interior system 100 includes a frame, shown as center console base 110, with a curved surface 120 including an optically bonded display 130. Vehicle interior system 200 includes a frame, shown as dashboard base 210, with a curved surface 220 including an optically bonded display 230. The dashboard base 210 typically includes an instrument panel 240 which may also include an optically bonded display. Vehicle interior system 300 includes a frame, shown as steering wheel base 310, with a curved surface 320 and an optically bonded display 330. In one or more embodiments, the vehicle interior system includes a frame that is an arm rest, a pillar, a seat back, a floor board, a headrest, a door panel, or any portion of the interior of a vehicle that includes a curved surface. In other embodiments, the frame is a portion of a housing for a free-standing display (i.e., a display that is not permanently connected to a portion of the vehicle).

The embodiments of the vehicle interior systems 100, 200 and 300 are merely exemplary. Further, while each of the embodiments depicted include at least one display, a display is not required according to the vehicle interior systems of the present disclosure. For example, the vehicle interior systems according to the present disclosure include the non-display cover surface for the dashboard, center console, door panel, etc. In such embodiments, the vehicle interior system may be provided with a coating (e.g., an ink or pigment coating) with a pattern (e.g., a brushed metal appearance, a wood grain appearance, a leather appearance, a colored appearance, etc.) to visually match the cover material with adjacent non-glass components. In specific embodiments, such ink or pigment coating may have a transparency level that provides for deadfront functionality.

Figure 2:
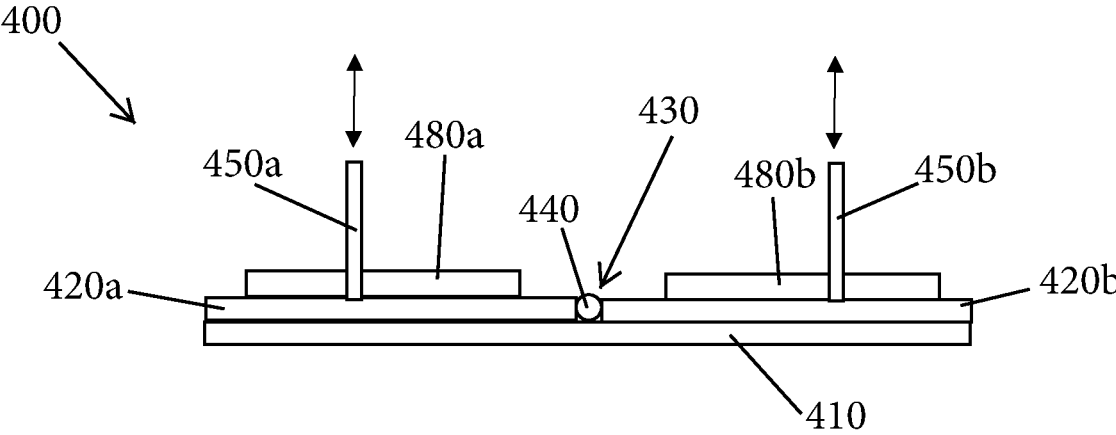
FIG. 2 is a top view of a vehicle interior system having a bendable surface, according to an exemplary embodiment.

FIG. 2 depicts a top view of the dynamically bendable vehicle interior system 400. As can be seen, the system 400 includes a layer of cover material 410 bonded to a first frame 420a and to a second frame 420b. In embodiments, the cover material 410 is one of a glass, a glass-ceramic, or a polymer. Exemplary glass materials include soda lime silicate glass, an aluminosilicate glass, a borosilicate glass, an boroaluminosilicate glass, or an alkali aluminosilicate glass. Such glass materials may be chemically strengthened such as through ion-exchange strengthening. Particular glass compositions and chemical strengthening techniques are discussed below. Exemplary glass-ceramics suitable for the cover material include at least one of the $Li_2O \times Al_2O_3 \times nSiO_2$ system (LAS system), the $MgO \times Al_2O_3 \times nSiO_2$ system (the MAS system), and the $ZnO \times Al_2O_3 \times nSiO_2$ system (the ZAS system), among others. Exemplary plastics suitable for the cover material include at least one of polymethylmethacrylate (PMMA), polyethylene terephthalate (PET), and cellulose triacetate (TAC), among others.

The first frame 420a and the second frame 420b define a bending axis 430, and the cover material 410 is continuous across the bending axis 430. In particular the cover material 410 is a continuous layer or sheet of glass, glass-ceramic, or polymer. In embodiments, the first frame 420a and the second frame 420b are joined by a pivotable joint 440 at the bending axis 430. In other embodiments, the first frame 420a and the second frame 420b are only joined by the cover material 410.

In embodiments, the first frame 420a is connected to a first actuator arm 450a, and the second frame is connected to a second actuator arm 450b. The actuator arms 450a, 450b move the frames 420a, 420b (as denoted by the double ended arrows of FIG. 2) such that the cover material 410 bends about the bending axis 430. In embodiments, the actuator arms 450a, 450b can be actuated via a variety of different actuation means, such as pneumatic or hydraulic actuation or mechanical linkages to a motor (such as a stepper motor).

Figure 3:
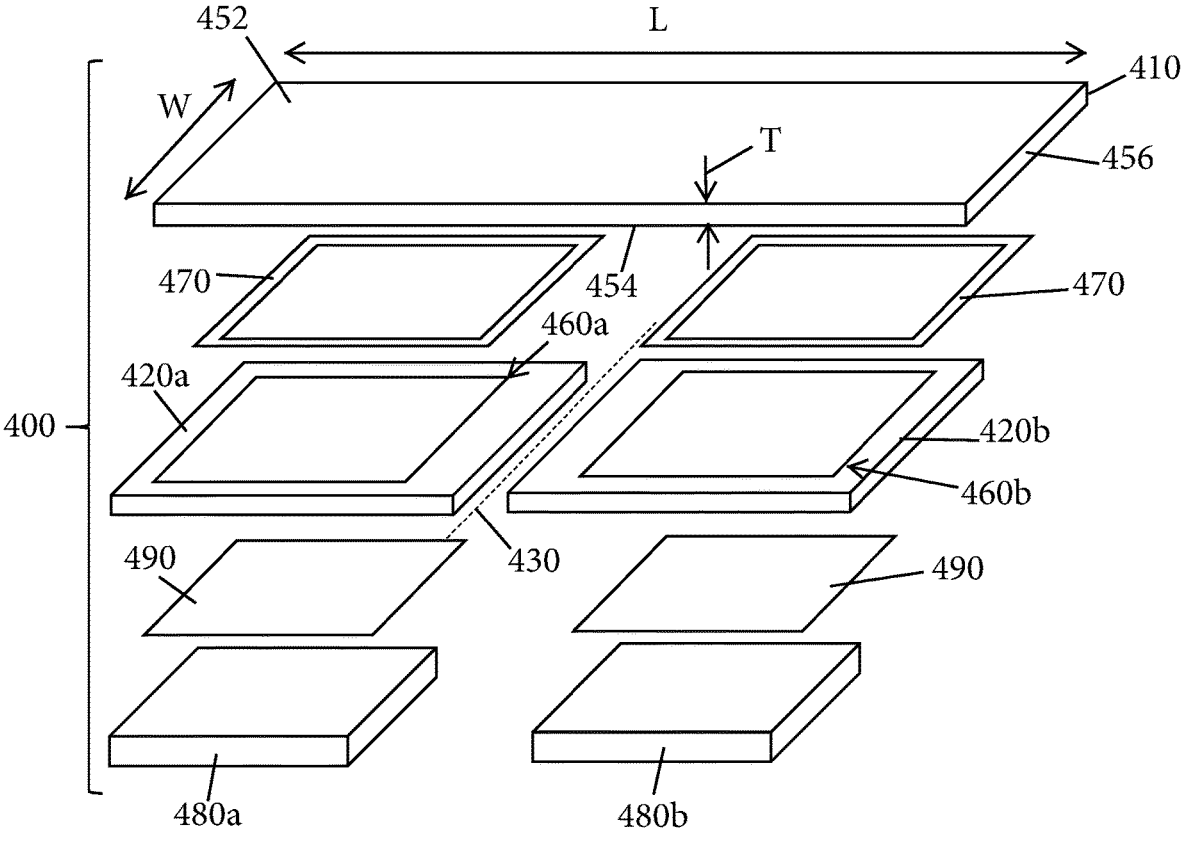
FIG. 3 depicts an exploded view of the vehicle interior surface of FIG. 2, according to an exemplary embodiment.

FIG. 3 depicts an exploded view of the system 400. As can be seen in FIG. 3, the cover material 410 has a first major surface 452 and a second major surface 454 that are joined by a minor surface 456. The first major surface 452 is a viewing surface for the occupants of the vehicle in which the vehicle interior system 400 is installed. The second major surface 454 is bonded to the first frame 420a and to the second frame 420b. In the embodiment depicted in FIG. 3, the first frame 420a includes a first aperture 460a, and the second frame 420b includes a second aperture 460b. In embodiments, adhesive 470 is applied around the apertures 460a, 460b to bond the second major surface 454 of the cover material 410 to the frames 420a, 420b. In embodiments, the apertures 460a, 460b are provided in the frames 420a, 420b so that a first display 480a and a second display 480b can be bonded to the second major surface 454 of the cover material 410 using, e.g., optically clear adhesive 490. The displays can be any of a variety of display types, including an LED display, a plasma display, an OLED display, and/or an LCD display.

FIG. 3 depicts the dimensions of the cover material 410. The cover material 410 has a length L and a width W. In embodiments, the length L is from 5 cm to 250 cm. In other embodiments, the length L is from 10 cm to 200 cm, and in still other embodiments, the length L is from 20 cm to 100 cm. In embodiments, the width W is from 5 cm to 250 cm. In other embodiments, the width W is from 10 cm to 200 cm, and in still other embodiments, the width W is from 20 cm to 100 cm. Further, the distance between the first major surface 452 and the second major surface 454 defines a thickness T of no more than 2 mm in embodiments. In other embodiments, the thickness T is from 0.1 mm to 1.3 mm. In embodiments, the cover material 410 substantially covers the frames 420a, 420b such that no portion of the frames 420a, 420b can be seen around the periphery of the cover material 410.

Figure 4:
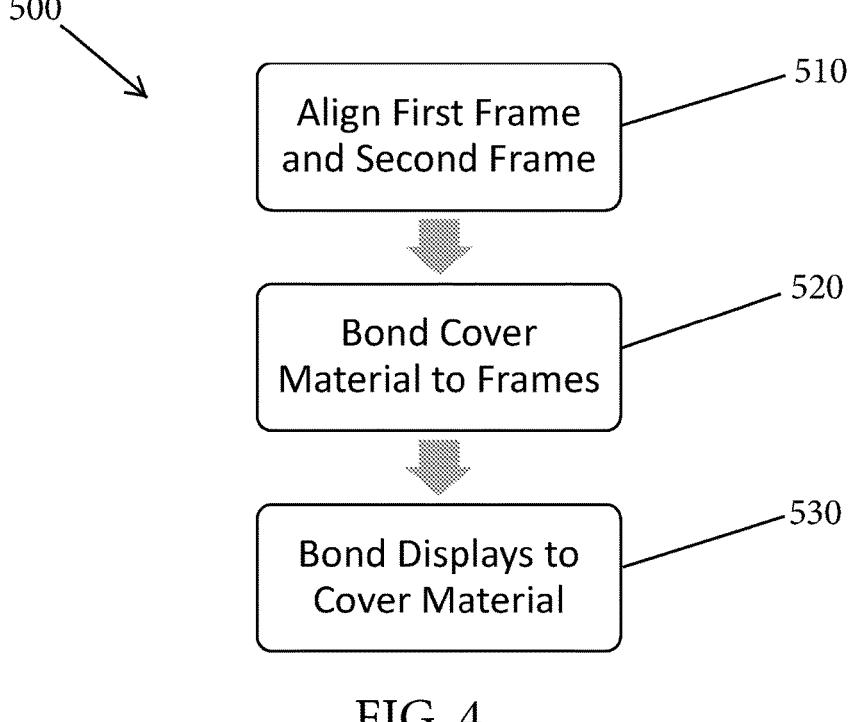
FIG. 4 depicts a method of assembling a vehicle interior system, according to an exemplary embodiment.
Figure 5:
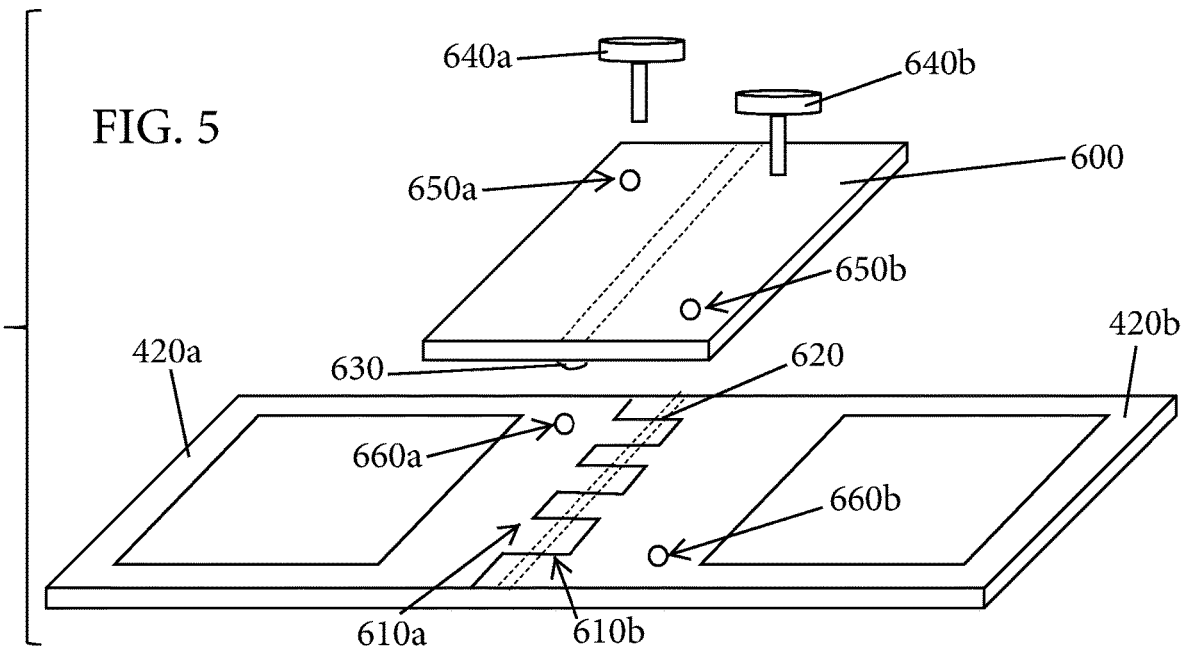
FIG. 5 depicts an alignment tool for aligning the frames of the vehicle interior system, according to an exemplary embodiment.

Having described the elements of the vehicle interior system 400, attention will now be turned to the manner in which the elements are assembled. In this regard, FIG. 4 provides a flowchart of an exemplary method 500 by which the system 400 is assembled. In a first step 510, the first frame 420a and the second frame 420b are aligned. FIG. 5 depicts an alignment tool 600 that assists in performing the first step 510 of the assembling method 500. As shown in FIG. 5, the first frame 420a and second frame 420b are brought together. In the embodiment depicted, the first frame 420a and the second frame 420b have complementary adjoining edges 610a, 610b. An alignment feature, in particular a groove 620, extends across the adjoining edges 610a, 610b. A complementary alignment feature, in particular a ridge 630 is provided on the alignment tool 600. When the frames 420a, 420b are brought into proximity, the alignment tool 600 is brought into contact with the frames 420a, 420b such that the ridge 630 lies in the groove 620, which aligns the adjoining edges 610*a*, 610*b* of the frames 420*a*, 420*b*. A first fastener 640*a* is inserted through a first through hole 650*a* of the alignment tool 600 and into a first receiving hole 660*a* of the first frame 420*a*. Similarly, a second fastener 640*b* is inserted through a second through hole 650*b* of the alignment tool 600 and into a second receiving hole 660*b* of the second frame 420*b*. In an exemplary embodiment, the fasteners 640*a*, 640*b* are threaded and the receive holes 660*a*, 660*b* contain mating threads. In this way, the frames 620*a*, 620*b* are secured together in alignment by the alignment tool 600.

Returning to the method 500 of FIG. 4, the next step 520 after the aligning step 510 is to bond the cover material 410 to the frames 420*a*, 420*b*. In particular, the alignment tool 600 is provided on a first side of the frames 420*a*, 420*b*, and the cover material 410 is provided on the side opposite to the side having the alignment tool 600. As mentioned above, the bonding step 520 involves the use of at least one adhesive 470. In embodiments, a first adhesive 470 is applied around the apertures 460*a*, 460*b* of the frames 420*a*, 420*b*, and no other adhesive is applied anywhere else on the frames 420*a*, 420*b*. In other embodiments, a first adhesive 470 is applied around the apertures 460*a*, 460*b*, and a second adhesive is applied between the two apertures 460*a*, 460*b*. In still another embodiment, the first adhesive 470 is applied over the entire bonding surface of the first and second frames 420*a*, 420*b*. In embodiments, the first adhesive 470 and the second adhesive have a modulus of 1.1 MPa to 10 GPa.

In embodiments, the adhesive 470 comprises a liquid adhesive. Exemplary liquid adhesives include toughened epoxy, flexible epoxy, acrylics, silicones, urethanes, polyurethanes, and silane modified polymers. In specific embodiments, the liquid adhesive includes one or more toughened epoxies, such as EP21TDCHT-LO (available from Masterbond®, Hackensack, NJ), 3M™ Scotch-Weld™ Epoxy DP460 Off-White (available from 3M, St. Paul, MN). In other embodiments, the liquid adhesive includes one or more flexible epoxies, such as Masterbond EP21TDC-2LO (available from Masterbond®, Hackensack, NJ), 3M™ Scotch-Weld™ Epoxy 2216 B/A Gray (available from 3M, St. Paul, MN), and 3M™ Scotch-Weld™ Epoxy DP125. In still other embodiments, the liquid adhesive includes one or more acrylics, such as LORD® Adhesive 410/Accelerator 19 w/LORD® AP 134 primer, LORD® Adhesive 852/ LORD® Accelerator 25 GB (both being available from LORD Corporation, Cary, NC), DELO PUR SJ9356 (available from DELO Industrial Adhesives, Windach, Germany), Loctite® AA4800, Loctite® HF8000, TEROSON® MS 9399, and TEROSON® MS 647-2C (these latter four being available from Henkel AG & Co. KGaA, Dusseldorf, Germany), among others. In yet other embodiments, the liquid adhesive includes one or more urethanes, such as 3M™ Scotch-Weld™ Urethane DP640 Brown and 3M™ Scotch-Weld™ Urethane DP604, and in still further embodiments, the liquid adhesive includes one or more silicones, such as Dow Corning® 995 (available from Dow Corning Corporation, Midland, MI).

Advantageously, the bonding step 520 is performed while the frames 420*a*, 420*b* are in a planar configuration. As compared to some conventional techniques for forming curved glass articles in which additional equipment is needed to hold the cover material in place during curing, curing in a planar configuration does not require, e.g., vacuum chucks, clamps, presses, pressure rollers, etc. to maintain the curvature of the glass. Notwithstanding and as will be discussed below, the cover material 410 is still able to be bent or curved even after curing.

After the bonding step 520, the method 500 includes an optional display attachment step 530. That is, while the embodiments depicted thus far have included displays 480*a*, 480*b*, a display is not required for each frame 420*a*, 420*b*. Additionally, in embodiments, neither frame includes an aperture for a display. In embodiments including one or more displays 480*a*, 480*b*, the displays 480*a*, 480*b* are bonded to the second major surface 454 of the cover material using an optically clear adhesive 490. In other embodiments, the displays 480*a*, 480*b* are attached to the cover material 410 prior to attaching the cover material 410 to the frames 420*a*, 420*b*. In such embodiments After the adhesive 470 bonding the cover material 410 to the frames 420*a*, 420*b* has cured, the alignment tool 600 can be removed. However, in embodiments, the alignment tool 600 is kept attached to the frames 420*a*, 420*b* during storage and/or transport to stabilize the assembly. In such embodiments, the alignment tool 600 could be removed just prior to installation of the vehicle interior system 400 into a vehicle.

Figure 6A:
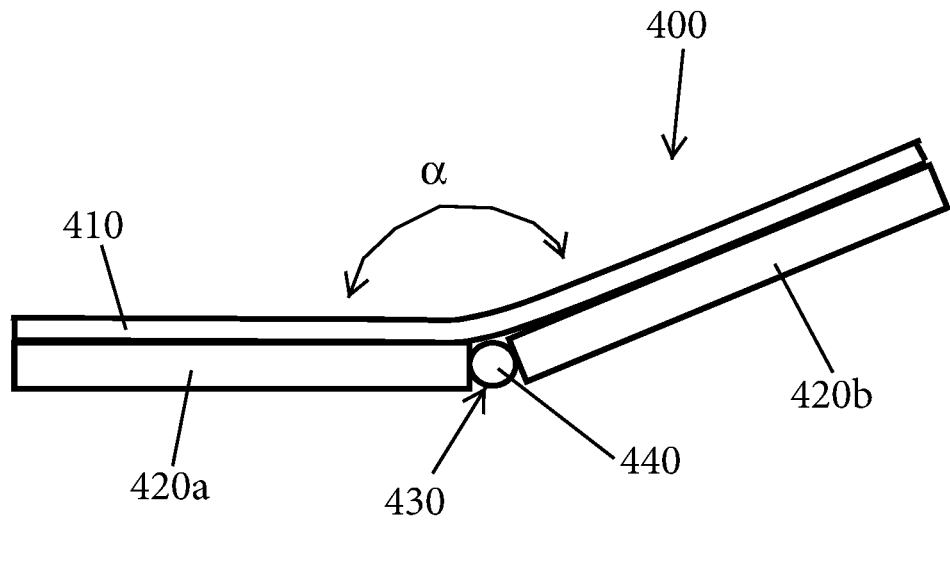
FIGS. 6A and 6B depict various configurations of the frames, according to an exemplary embodiment.
Figure 6B:
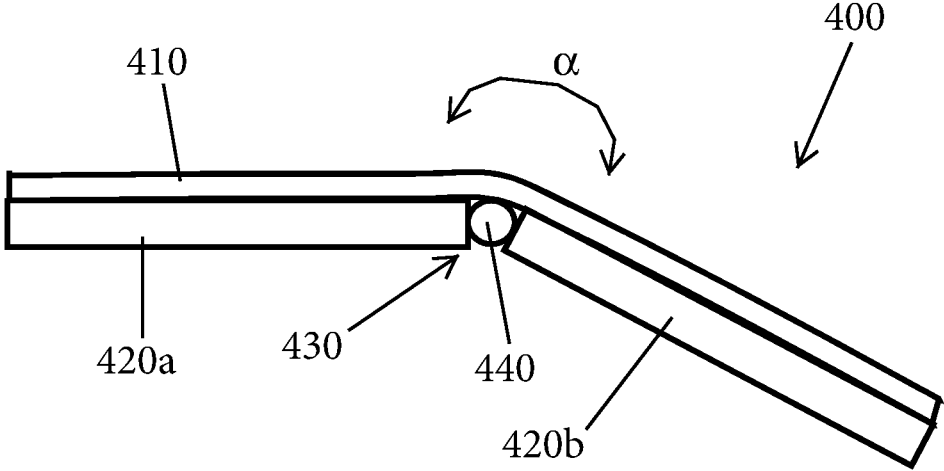

FIGS. 6A and 6B demonstrate the curvature that can be introduced into the vehicle interior system 400. As shown in FIG. 6A, the second frame 420*b* forms an angle α with respect to the first frame 420*a*, which creates a curvature in the cover material 410. In embodiments, the angle α between the first frame 420*a* and the second frame 420*b* is from about 90° to less than 180°. In other embodiments, the angle α is from about 110° to less than 180°, and in still other embodiments, the angle α is from about 130° to less than 180°. In FIG. 6A, the curvature is concave, and in embodiments, the cover material 410 can be bent to a concave curve having a radius of curvature as tight as 60 mm, as tight as 40 mm, or even as tight as 30 mm (or in other words, a radius of curvature of about 30 mm or greater, about 50 mm or greater or about 60 mm or greater) in the non-planar configuration. FIG. 6B depicts a convex curvature of the vehicle interior system 400. That is, the angle α between the first frame 420*a* and the second frame 420*b* is from greater than 180° to about 270° in embodiments. In other embodiments, the angle α is from greater than 180° to about 250°, and in still other embodiments, the angle α is from greater than 180° to about 250°. In embodiments, the cover material 410 can be bent to a convex curve having a radius of curvature as tight as 60 mm, as tight as 40 mm, or even as tight as 30 mm (or in other words, a radius of curvature of about 30 mm or greater, about 50 mm or greater or about 60 mm or greater) in the non-planar configuration.

The various embodiments of the vehicle interior system may be incorporated into vehicles such as trains, automobiles (e.g., cars, trucks, buses and the like), sea craft (boats, ships, submarines, and the like), and aircraft (e.g., drones, airplanes, jets, helicopters and the like). As mentioned above, the dynamically bendable vehicle interior system 400 allows for a surface to transition between a planar configuration and a non-planar configuration. In embodiments, the non-planar configuration may correspond to directing a display to a particular viewer, such as the driver of a vehicle so that the driver does not have to take his or her eyes away from the path ahead. In other embodiments, in particular embodiments without a display, the planar or non-planar configuration may correspond to the opening of a storage compartment, such as the opening of a glove box in a dashboard.

Strengthened Glass Properties

As noted above, the cover material 410 may comprise a strengthened glass. In one or more embodiments, cover material 410 may be strengthened to include compressive stress that extends from a surface to a depth of compression (DOC). The compressive stress regions are balanced by a central portion exhibiting a tensile stress. At the DOC, the stress crosses from a negative (compressive) stress to a positive (tensile) stress.

In various embodiments, glass cover material 410 may be strengthened mechanically by utilizing a mismatch of the coefficient of thermal expansion between portions of the article to create a compressive stress region and a central region exhibiting a tensile stress. In some embodiments, the glass substrate may be strengthened thermally by heating the glass to a temperature above the glass transition point and then rapidly quenching.

In various embodiments, glass cover material 410 may be chemically strengthened by ion exchange. In the ion exchange process, ions at or near the surface of the glass substrate are replaced by—or exchanged with—larger ions having the same valence or oxidation state. In those embodiments in which the glass substrate comprises an alkali aluminosilicate glass, ions in the surface layer of the article and the larger ions are monovalent alkali metal cations, such as Li$^+$, Na$^+$, K$^+$, Rb$^+$, and Cs$^+$. Alternatively, monovalent cations in the surface layer may be replaced with monovalent cations other than alkali metal cations, such as Ag$^+$ or the like. In such embodiments, the monovalent ions (or cations) exchanged into the glass substrate generate a stress.

Ion exchange processes are typically carried out by immersing a glass substrate in a molten salt bath (or two or more molten salt baths) containing the larger ions to be exchanged with the smaller ions in the glass substrate. It should be noted that aqueous salt baths may also be utilized. In addition, the composition of the bath(s) may include more than one type of larger ions (e.g., Na+ and K+) or a single larger ion. It will be appreciated by those skilled in the art that parameters for the ion exchange process, including, but not limited to, bath composition and temperature, immersion time, the number of immersions of the glass substrate in a salt bath (or baths), use of multiple salt baths, additional steps such as annealing, washing, and the like, are generally determined by the composition of the glass substrate (including the structure of the article and any crystalline phases present) and the desired DOC and CS of the glass substrate that results from strengthening. Exemplary molten bath compositions may include nitrates, sulfates, and chlorides of the larger alkali metal ion. Typical nitrates include KNO$_3$, NaNO$_3$, LiNO$_3$, NaSO$_4$ and combinations thereof. The temperature of the molten salt bath typically is in a range from about 380° C. up to about 450° C., while immersion times range from about 15 minutes up to about 100 hours depending on glass substrate thickness, bath temperature and glass (or monovalent ion) diffusivity.

However, temperatures and immersion times different from those described above may also be used.

In one or more embodiments, the glass substrates may be immersed in a molten salt bath of 100% NaNO$_3$, 100% KNO$_3$, or a combination of NaNO$_3$ and KNO$_3$ having a temperature from about 370° C. to about 480° C. In some embodiments, the glass substrate may be immersed in a molten mixed salt bath including from about 5% to about 90% KNO$_3$ and from about 10% to about 95% NaNO$_3$. In one or more embodiments, the glass substrate may be immersed in a second bath, after immersion in a first bath. The first and second baths may have different compositions and/or temperatures from one another. The immersion times in the first and second baths may vary. For example, immersion in the first bath may be longer than the immersion in the second bath.

In one or more embodiments, the glass substrate may be immersed in a molten, mixed salt bath including NaNO$_3$ and KNO$_3$ (e.g., 49%/51%, 50%/50%, 51%/49%) having a temperature less than about 420° C. (e.g., about 400° C. or about 380° C.) for less than about 5 hours, or even about 4 hours or less.

Ion exchange conditions can be tailored to provide a "spike" or to increase the slope of the stress profile at or near the surface of the resulting glass substrate. The spike may result in a greater surface CS value. This spike can be achieved by a single bath or multiple baths, with the bath(s) having a single composition or mixed composition, due to the unique properties of the glass compositions used in the glass substrates described herein.

In one or more embodiments, where more than one monovalent ion is exchanged into the glass substrate, the different monovalent ions may exchange to different depths within the glass substrate (and generate different magnitudes stresses within the glass substrate at different depths). The resulting relative depths of the stress-generating ions can be determined and cause different characteristics of the stress profile.

CS is measured using those means known in the art, such as by surface stress meter (FSM) using commercially available instruments such as the FSM-6000, manufactured by Orihara Industrial Co., Ltd. (Japan). Surface stress measurements rely upon the accurate measurement of the stress optical coefficient (SOC), which is related to the birefringence of the glass. SOC in turn is measured by those methods that are known in the art, such as fiber and four point bend methods, both of which are described in ASTM standard C770-98 (2013), entitled "Standard Test Method for Measurement of Glass Stress-Optical Coefficient," the contents of which are incorporated herein by reference in their entirety, and a bulk cylinder method. As used herein CS may be the "maximum compressive stress" which is the highest compressive stress value measured within the compressive stress layer. In some embodiments, the maximum compressive stress is located at the surface of the glass substrate. In other embodiments, the maximum compressive stress may occur at a depth below the surface, giving the compressive profile the appearance of a "buried peak."

DOC may be measured by FSM or by a scattered light polariscope (SCALP) (such as the SCALP-04 scattered light polariscope available from Glasstress Ltd., located in Tallinn Estonia), depending on the strengthening method and conditions. When the glass substrate is chemically strengthened by an ion exchange treatment, FSM or SCALP may be used depending on which ion is exchanged into the glass substrate. Where the stress in the glass substrate is generated by exchanging potassium ions into the glass substrate, FSM is used to measure DOC. Where the stress is generated by exchanging sodium ions into the glass substrate, SCALP is used to measure DOC. Where the stress in the glass substrate is generated by exchanging both potassium and sodium ions into the glass, the DOC is measured by SCALP, since it is believed the exchange depth of sodium indicates the DOC and the exchange depth of potassium ions indicates a change in the magnitude of the compressive stress (but not the change in stress from compressive to tensile); the exchange depth of potassium ions in such glass substrates is measured by FSM. Central tension or CT is the maximum tensile stress and is measured by SCALP.

In one or more embodiments, the glass substrate may be strengthened to exhibit a DOC that is described as a fraction of the thickness T of the glass substrate (as described herein). For example, in one or more embodiments, the DOC may be equal to or greater than about 0.05T, equal to or greater than about 0.1T, equal to or greater than about 0.11T, equal to or greater than about 0.12T, equal to or greater than about 0.13T, equal to or greater than about 0.14T, equal to or greater than about 0.15T, equal to or greater than about 0.16T, equal to or greater than about 0.17T, equal to or greater than about 0.18T, equal to or greater than about 0.19T, equal to or greater than about 0.2T, equal to or greater than about 0.21T. In some embodiments, the DOC may be in a range from about 0.08T to about 0.25T, from about 0.09T to about 0.25T, from about 0.18T to about 0.25T, from about 0.11T to about 0.25T, from about 0.12T to about 0.25T, from about 0.13T to about 0.25T, from about 0.14T to about 0.25T, from about 0.15T to about 0.25T, from about 0.08T to about 0.24T, from about 0.08T to about 0.23T, from about 0.08T to about 0.22T, from about 0.08T to about 0.21T, from about 0.08T to about 0.2T, from about 0.08T to about 0.19T, from about 0.08T to about 0.18T, from about 0.08T to about 0.17T, from about 0.08T to about 0.16T, or from about 0.08T to about 0.15T. In some instances, the DOC may be about 20 μm or less. In one or more embodiments, the DOC may be about 40 μm or greater (e.g., from about 40 μm to about 300 μm, from about 50 μm to about 300 μm, from about 60 μm to about 300 μm, from about 70 μm to about 300 μm, from about 80 μm to about 300 μm, from about 90 μm to about 300 μm, from about 100 μm to about 300 μm, from about 110 μm to about 300 μm, from about 120 μm to about 300 μm, from about 140 μm to about 300 μm, from about 150 μm to about 300 μm, from about 40 μm to about 290 μm, from about 40 μm to about 280 μm, from about 40 μm to about 260 μm, from about 40 μm to about 250 μm, from about 40 μm to about 240 μm, from about 40 μm to about 230 μm, from about 40 μm to about 220 μm, from about 40 μm to about 210 μm, from about 40 μm to about 200 μm, from about 40 μm to about 180 μm, from about 40 μm to about 160 μm, from about 40 μm to about 150 μm, from about 40 μm to about 140 μm, from about 40 μm to about 130 μm, from about 40 μm to about 120 μm, from about 40 μm to about 110 μm, or from about 40 μm to about 100 μm. In other embodiments, DOC falls within any one of the exact numerical ranges set forth in this paragraph.

In one or more embodiments, the strengthened glass substrate may have a CS (which may be found at the surface or a depth within the glass substrate) of about 200 MPa or greater, 300 MPa or greater, 400 MPa or greater, about 500 MPa or greater, about 600 MPa or greater, about 700 MPa or greater, about 800 MPa or greater, about 900 MPa or greater, about 930 MPa or greater, about 1000 MPa or greater, or about 1050 MPa or greater.

In one or more embodiments, the strengthened glass substrate may have a maximum tensile stress or central tension (CT) of about 20 MPa or greater, about 30 MPa or greater, about 40 MPa or greater, about 45 MPa or greater, about 50 MPa or greater, about 60 MPa or greater, about 70 MPa or greater, about 75 MPa or greater, about 80 MPa or greater, or about 85 MPa or greater. In some embodiments, the maximum tensile stress or central tension (CT) may be in a range from about 40 MPa to about 100 MPa. In other embodiments, CS falls within the exact numerical ranges set forth in this paragraph.

Glass Compositions

Suitable glass compositions for use in glass cover material 410 include soda lime glass, aluminosilicate glass, borosilicate glass, boroaluminosilicate glass, alkali-containing aluminosilicate glass, alkali-containing borosilicate glass, and alkali-containing boroaluminosilicate glass.

Unless otherwise specified, the glass compositions disclosed herein are described in mole percent (mol %) as analyzed on an oxide basis.

In one or more embodiments, the glass composition may include $SiO_2$ in an amount in a range from about 66 mol % to about 80 mol %, from about 67 mol % to about 80 mol %, from about 68 mol % to about 80 mol %, from about 69 mol % to about 80 mol %, from about 70 mol % to about 80 mol %, from about 72 mol % to about 80 mol %, from about 65 mol % to about 78 mol %, from about 65 mol % to about 76 mol %, from about 65 mol % to about 75 mol %, from about 65 mol % to about 74 mol %, from about 65 mol % to about 72 mol %, or from about 65 mol % to about 70 mol %, and all ranges and sub-ranges therebetween.

In one or more embodiments, the glass composition includes $Al_2O_3$ in an amount greater than about 4 mol %, or greater than about 5 mol %. In one or more embodiments, the glass composition includes $Al_2O_3$ in a range from greater than about 7 mol % to about 15 mol %, from greater than about 7 mol % to about 14 mol %, from about 7 mol % to about 13 mol %, from about 4 mol % to about 12 mol %, from about 7 mol % to about 11 mol %, from about 8 mol % to about 15 mol %, from about 9 mol % to about 15 mol %, from about 10 mol % to about 15 mol %, from about 11 mol % to about 15 mol %, or from about 12 mol % to about 15 mol %, and all ranges and sub-ranges therebetween. In one or more embodiments, the upper limit of $Al_2O_3$ may be about 14 mol %, 14.2 mol %, 14.4 mol %, 14.6 mol %, or 14.8 mol %.

In one or more embodiments, the glass article is described as an aluminosilicate glass article or including an aluminosilicate glass composition. In such embodiments, the glass composition or article formed therefrom includes $SiO_2$ and $Al_2O_3$ and is not a soda lime silicate glass. In this regard, the glass composition or article formed therefrom includes $Al_2O_3$ in an amount of about 2 mol % or greater, 2.25 mol % or greater, 2.5 mol % or greater, about 2.75 mol % or greater, about 3 mol % or greater.

In one or more embodiments, the glass composition comprises $B_2O_3$ (e.g., about 0.01 mol % or greater). In one or more embodiments, the glass composition comprises $B_2O_3$ in an amount in a range from about 0 mol % to about 5 mol %, from about 0 mol % to about 4 mol %, from about 0 mol % to about 3 mol %, from about 0 mol % to about 2 mol %, from about 0 mol % to about 1 mol %, from about 0 mol % to about 0.5 mol %, from about 0.1 mol % to about 5 mol %, from about 0.1 mol % to about 4 mol %, from about 0.1 mol % to about 3 mol %, from about 0.1 mol % to about 2 mol %, from about 0.1 mol % to about 1 mol %, from about 0.1 mol % to about 0.5 mol %, and all ranges and sub-ranges therebetween. In one or more embodiments, the glass composition is substantially free of $B_2O_3$.

As used herein, the phrase "substantially free" with respect to the components of the composition means that the component is not actively or intentionally added to the composition during initial batching, but may be present as an impurity in an amount less than about 0.001 mol %.

In one or more embodiments, the glass composition optionally comprises $P_2O_5$ (e.g., about 0.01 mol % or greater). In one or more embodiments, the glass composition comprises a non-zero amount of $P_2O_5$ up to and including 2 mol %, 1.5 mol %, 1 mol %, or 0.5 mol %. In one or more embodiments, the glass composition is substantially free of $P_2O_5$.

In one or more embodiments, the glass composition may include a total amount of $R_2O$ (which is the total amount of alkali metal oxide such as $Li_2O$, $Na_2O$, $K_2O$, $Rb_2O$, and Cs$_2$O) that is greater than or equal to about 8 mol %, greater than or equal to about 10 mol %, or greater than or equal to about 12 mol %. In some embodiments, the glass composition includes a total amount of R$_2$O in a range from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 13 mol %, and all ranges and sub-ranges therebetween. In one or more embodiments, the glass composition may be substantially free of Rb$_2$O, Cs$_2$O or both Rb$_2$O and Cs$_2$O. In one or more embodiments, the R$_2$O may include the total amount of Li$_2$O, Na$_2$O and K$_2$O only. In one or more embodiments, the glass composition may comprise at least one alkali metal oxide selected from Li$_2$O, Na$_2$O and K$_2$O, wherein the alkali metal oxide is present in an amount greater than about 8 mol % or greater.

In one or more embodiments, the glass composition comprises Na$_2$O in an amount greater than or equal to about 8 mol %, greater than or equal to about 10 mol %, or greater than or equal to about 12 mol %. In one or more embodiments, the composition includes Na$_2$O in a range from about from about 8 mol % to about 20 mol %, from about 8 mol % to about 18 mol %, from about 8 mol % to about 16 mol %, from about 8 mol % to about 14 mol %, from about 8 mol % to about 12 mol %, from about 9 mol % to about 20 mol %, from about 10 mol % to about 20 mol %, from about 11 mol % to about 20 mol %, from about 12 mol % to about 20 mol %, from about 13 mol % to about 20 mol %, from about 10 mol % to about 14 mol %, or from 11 mol % to about 16 mol %, and all ranges and sub-ranges therebetween.

In one or more embodiments, the glass composition includes less than about 4 mol % K$_2$O, less than about 3 mol % K$_2$O, or less than about 1 mol % K$_2$O. In some instances, the glass composition may include K$_2$O in an amount in a range from about 0 mol % to about 4 mol %, from about 0 mol % to about 3.5 mol %, from about 0 mol % to about 3 mol %, from about 0 mol % to about 2.5 mol %, from about 0 mol % to about 2 mol %, from about 0 mol % to about 1.5 mol %, from about 0 mol % to about 1 mol %, from about 0 mol % to about 0.5 mol %, from about 0 mol % to about 0.2 mol %, from about 0 mol % to about 0.1 mol %, from about 0.5 mol % to about 4 mol %, from about 0.5 mol % to about 3.5 mol %, from about 0.5 mol % to about 3 mol %, from about 0.5 mol % to about 2.5 mol %, from about 0.5 mol % to about 2 mol %, from about 0.5 mol % to about 1.5 mol %, or from about 0.5 mol % to about 1 mol %, and all ranges and sub-ranges therebetween. In one or more embodiments, the glass composition may be substantially free of K$_2$O.

In one or more embodiments, the glass composition is substantially free of Li$_2$O.

In one or more embodiments, the amount of Na$_2$O in the composition may be greater than the amount of Li$_2$O. In some instances, the amount of Na$_2$O may be greater than the combined amount of Li$_2$O and K$_2$O. In one or more alternative embodiments, the amount of Li$_2$O in the composition may be greater than the amount of Na$_2$O or the combined amount of Na$_2$O and K$_2$O.

In one or more embodiments, the glass composition may include a total amount of RO (which is the total amount of alkaline earth metal oxide such as CaO, MgO, BaO, ZnO and SrO) in a range from about 0 mol % to about 2 mol %.

In some embodiments, the glass composition includes a non-zero amount of RO up to about 2 mol %. In one or more embodiments, the glass composition comprises RO in an amount from about 0 mol % to about 1.8 mol %, from about 0 mol % to about 1.6 mol %, from about 0 mol % to about 1.5 mol %, from about 0 mol % to about 1.4 mol %, from about 0 mol % to about 1.2 mol %, from about 0 mol % to about 1 mol %, from about 0 mol % to about 0.8 mol %, from about 0 mol % to about 0.5 mol %, and all ranges and sub-ranges therebetween.

In one or more embodiments, the glass composition includes CaO in an amount less than about 1 mol %, less than about 0.8 mol %, or less than about 0.5 mol %. In one or more embodiments, the glass composition is substantially free of CaO.

In some embodiments, the glass composition comprises MgO in an amount from about 0 mol % to about 7 mol %, from about 0 mol % to about 6 mol %, from about 0 mol % to about 5 mol %, from about 0 mol % to about 4 mol %, from about 0.1 mol % to about 7 mol %, from about 0.1 mol % to about 6 mol %, from about 0.1 mol % to about 5 mol %, from about 0.1 mol % to about 4 mol %, from about 1 mol % to about 7 mol %, from about 2 mol % to about 6 mol %, or from about 3 mol % to about 6 mol %, and all ranges and sub-ranges therebetween.

In one or more embodiments, the glass composition comprises ZrO$_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises ZrO$_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition comprises SnO$_2$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises SnO$_2$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

In one or more embodiments, the glass composition may include an oxide that imparts a color or tint to the glass articles. In some embodiments, the glass composition includes an oxide that prevents discoloration of the glass article when the glass article is exposed to ultraviolet radiation. Examples of such oxides include, without limitation oxides of: Ti, V, Cr, Mn, Fe, Co, Ni, Cu, Ce, W, and Mo.

In one or more embodiments, the glass composition includes Fe expressed as Fe$_2$O$_3$, wherein Fe is present in an amount up to (and including) about 1 mol %. In some embodiments, the glass composition is substantially free of Fe. In one or more embodiments, the glass composition comprises Fe$_2$O$_3$ in an amount equal to or less than about 0.2 mol %, less than about 0.18 mol %, less than about 0.16 mol %, less than about 0.15 mol %, less than about 0.14 mol %, less than about 0.12 mol %. In one or more embodiments, the glass composition comprises Fe$_2$O$_3$ in a range from about 0.01 mol % to about 0.2 mol %, from about 0.01 mol % to about 0.18 mol %, from about 0.01 mol % to about 0.16 mol %, from about 0.01 mol % to about 0.15 mol %, from about 0.01 mol % to about 0.14 mol %, from about 0.01 mol % to about 0.12 mol %, or from about 0.01 mol % to about 0.10 mol %, and all ranges and sub-ranges therebetween.

Where the glass composition includes $TiO_2$, $TiO_2$ may be present in an amount of about 5 mol % or less, about 2.5 mol % or less, about 2 mol % or less or about 1 mol % or less. In one or more embodiments, the glass composition may be substantially free of $TiO_2$.

An exemplary glass composition includes $SiO_2$ in an amount in a range from about 65 mol % to about 75 mol %, $Al_2O_3$ in an amount in a range from about 8 mol % to about 14 mol %, $Na_2O$ in an amount in a range from about 12 mol % to about 17 mol %, $K_2O$ in an amount in a range of about 0 mol % to about 0.2 mol %, and MgO in an amount in a range from about 1.5 mol % to about 6 mol %. Optionally, $SnO_2$ may be included in the amounts otherwise disclosed herein. It should be understood, that while the preceding glass composition paragraphs express approximate ranges, in other embodiments, glass cover material 410 may be made from any glass composition falling with any one of the exact numerical ranges discussed above.

Aspect (1) of this disclosure pertains to a vehicle interior system, comprising: a first frame having a first end and a second end; a second frame having a third end and a fourth end, wherein the third end of the second frame is arranged proximal to the second end of the first frame and wherein the first frame and the second frame define a bending axis between the second end and the third end; a continuous cover material bonded to the first frame and to the second frame and across the bending axis; a first display device positioned in a first aperture of the first frame; wherein the system has a first configuration in which the first frame is substantially planar with the second frame and a second configuration in which the first frame is not substantially planar with the second frame; and wherein the system is configured to reversibly transition between the first configuration and the second configuration.

Aspect (2) of this disclosure pertains to the vehicle interior system of Aspect (1), wherein the continuous cover material comprises at least one of a plastic, a glass, or a glass-ceramic.

Aspect (3) of this disclosure pertains to the vehicle interior system of Aspect (2), wherein the continuous cover material comprises a glass and wherein the glass comprises at least one of a soda lime silicate glass, an aluminosilicate glass, a borosilicate glass, an boroaluminosilicate glass, or an alkali aluminosilicate glass.

Aspect (4) of this disclosure pertains to the vehicle interior system of Aspect (3), wherein the glass is chemically strengthened with an ion-exchange treatment.

Aspect (5) of this disclosure pertains to the vehicle interior system of any one of Aspects (1) through (4), wherein the continuous cover material has a thickness of at most 2 mm.

Aspect (6) of this disclosure pertains to the vehicle interior system of Aspect (5), wherein thickness is in the range of 0.1 to 1.3 mm.

Aspect (7) of this disclosure pertains to the vehicle interior system of any one of Aspects (1) through (6), wherein the continuous cover material provides a deadfront for the display device when the display device is off.

Aspect (8) of this disclosure pertains to the vehicle interior system of any one of Aspects (1) through (7), further comprising a second display device mounted to the second frame.

Aspect (9) of this disclosure pertains to the vehicle interior system of any one of Aspects (1) through (8), wherein a first adhesive bonds the continuous cover material to the first frame and to the second frame and wherein the first adhesive has a modulus of 1.1 MPa to 10 GPa.

Aspect (10) of this disclosure pertains to the vehicle interior system of Aspect (9), wherein the first adhesive is applied at least at the first end of the first frame and at the fourth end of the second frame.

Aspect (11) of this disclosure pertains to the vehicle interior system of Aspect (10), wherein the first adhesive is not applied in a middle region of the vehicle interior system over the second end of the first frame and the third end of the second frame.

Aspect (12) of this disclosure pertains to the vehicle interior system of Aspect (11), wherein a second adhesive is applied in the middle region.

Aspect (13) of this disclosure pertains to the vehicle interior system of any one of Aspects (1) through (12), further comprising an actuator configured to move the system between the first configuration and the second configuration.

Aspect (14) of this disclosure pertains to the vehicle interior system of any one of Aspects (1) through (13, wherein the second configuration defines a concave bend in the cover glass.

Aspect (15) of this disclosure pertains to the vehicle interior system of any one of Aspects (1) through (13), wherein the second configuration defines a convex bend in the cover glass.

Aspect (16) of this disclosure pertains to the vehicle interior system of any one of Aspects (1) through (13), wherein the second configuration defines at least one of a concave bend or a convex bend n the cover glass.

Aspect (17) of this disclosure pertains to the vehicle interior system of any one of Aspects (1) through (16), wherein, in the second configuration, the second frame forms an angle with the first frame and wherein the angle is in the range of 90° to less than 180° or greater than 180° to 270°.

Aspect (18) of this disclosure pertains to the vehicle interior system of any one of Aspects (1) through (17), wherein the continuous cover material is configured to bend to a radius of curvature of about 60 mm or greater in the second configuration.

Aspect (19) of this disclosure pertains to the vehicle interior system of any one of Aspects (1) through (18), wherein the second end of the first frame and the third end of the second frame are connected by a pivotable joint at the bending axis.

Aspect (20) of this disclosure pertains to the vehicle interior system of any one of Aspects (1) through (19), wherein the vehicle interior system is at least one of center information display, an instrument panel, or an interior dashboard.

Aspect (21) of this disclosure pertains to a vehicle interior system, comprising: a first frame having a first end and a second end; a second frame having a third end and a fourth end, wherein the third end of the second frame is arranged proximal to the second end of the first frame and wherein the first frame and the second frame define a bending axis between the second end and the third end; a continuous cover glass bonded to the first frame and to the second frame and across the bending axis; wherein the vehicle interior system has a first configuration in which the first frame is substantially planar with the second frame and a second configuration in which the first frame is not substantially planar with the second frame; and wherein the vehicle interior system is configured to reversibly transition between the first configuration and the second configuration.

Aspect (22) of this disclosure pertains to the vehicle interior system of Aspect (21), wherein the continuous cover glass comprises at least one of a soda lime silicate glass, an aluminosilicate glass, a borosilicate glass, an boroaluminosilicate glass, or an alkali aluminosilicate glass.

Aspect (23) of this disclosure pertains to the vehicle interior system of Aspect (21) or Aspect (22), wherein the continuous cover glass has a thickness of at most 2 mm.

Aspect (24) of this disclosure pertains to the vehicle interior system of Aspect (23), wherein thickness is in the range of 0.1 to 1.3 mm.

Aspect (25) of this disclosure pertains to the vehicle interior system of Aspect (21) or Aspect (24), further comprising a first display device mounted to the first frame.

Aspect (26) of this disclosure pertains to the vehicle interior system of Aspect (25), further comprising a second display device mounted to the second frame.

Aspect (27) of this disclosure pertains to the vehicle interior system of Aspect (26), wherein the continuous cover glass provides a deadfront for the first display device or the second display device when the respective first or second display device is off.

Aspect (28) of this disclosure pertains to the vehicle interior system of any one of Aspects (21) through (27), wherein a first adhesive bonds the continuous cover glass to the first frame and to the second frame and wherein the first adhesive has a modulus of 1.1 MPa to 10 GPa.

Aspect (29) of this disclosure pertains to the vehicle interior system of Aspect (28), wherein the first adhesive is applied at least in at the first end of the first frame and at the fourth end of the second frame.

Aspect (30) of this disclosure pertains to the vehicle interior system of Aspect (29), wherein the first adhesive is not applied in a middle region of the vehicle interior system over the second end of the first frame and the third end of the second frame.

Aspect (31) of this disclosure pertains to the vehicle interior system of Aspect (30), wherein a second adhesive is applied in the middle region.

Aspect (32) of this disclosure pertains to the vehicle interior system of any one of Aspects (21) through (31), further comprising an actuator configured to move the system between the first configuration and the second configuration.

Aspect (33) of this disclosure pertains to the vehicle interior system of any one of Aspects (21) through (32), wherein the second configuration defines a concave bend.

Aspect (34) of this disclosure pertains to the vehicle interior system of any one of Aspects (21) through (32), wherein the second configuration defines a convex bend.

Aspect (35) of this disclosure pertains to the vehicle interior system of any one of Aspects (21) through (32), wherein the second configuration defines at least one of a concave bend or a convex bend.

Aspect (36) of this disclosure pertains to the vehicle interior system of any one of Aspects (21) through (35), wherein, in the second configuration, the second frame forms an angle with the first frame and wherein the angle is in the range of 90° to less than 180° or greater than 180° to 270°.

Aspect (37) of this disclosure pertains to the vehicle interior system of any one of Aspects (21) through (36), wherein the continuous cover glass is configured to bend to a mm in the second configuration.

Aspect (38) of this disclosure pertains to the vehicle interior system of any one of Aspects (21) through (37), wherein the vehicle interior system is at least one of glovebox, a storage compartment, or an interior dashboard.

Aspect (39) of this disclosure pertains to a method of assembling a vehicle interior system, the method comprising the steps of: aligning a first frame with a second frame in a planar configuration, wherein a bending axis is formed between the first frame and the second frame; applying a first adhesive to at least end regions of the first and second frames; laminating a continuous cover material to the first and second frames and over the bending axis while the frame is in the planar configuration.

Aspect (40) of this disclosure pertains to the method of Aspect (39), wherein the step of aligning further comprises attaching an alignment plate to the first frame and the second frame, inserting a first fastener through the alignment plate into the first frame, and inserting a second fastener through the alignment plate into the second frame.

Aspect (41) of this disclosure pertains to the method of Aspect (40), wherein the step of aligning further comprises mating raised or recessed features of the first and second frames with complementary recessed or raised features of the alignment plate.

Aspect (42) of this disclosure pertains to the method of any one of Aspects (39) through (41), further comprising the step of mounting a first display device to the continuous cover material.

Aspect (43) of this disclosure pertains to the method of Aspect (42), wherein the first display device is mounted to the continuous cover material before the continuous cover material is laminated to the first frame and to the second frame.

Aspect (44) of this disclosure pertains to the method of Aspect (42) or Aspect (43), further comprising the step of mounting a second display device to the continuous cover material.

Aspect (45) of this disclosure pertains to the method of Aspect (44), wherein the second display device is mounted to the continuous cover material before the continuous cover material is laminated to the first frame and to the second frame.

Aspect (46) of this disclosure pertains to the method of any one of Aspects (39) through (45), wherein the continuous cover material comprises at least one of a plastic, a glass, or a glass-ceramic.

Aspect (47) of this disclosure pertains to the method of Aspect (46), wherein the continuous cover material comprises a glass and wherein the glass comprises at least one of a soda lime silicate glass, an aluminosilicate glass, a borosilicate glass, an boroaluminosilicate glass, or an alkali aluminosilicate glass.

Aspect (48) of this disclosure pertains to the method of any one of Aspects (39) through (47), wherein the continuous cover material has a thickness of at most 2 mm.

Aspect (49) of this disclosure pertains to the method of Aspect (48), wherein thickness is in the range of 0.1 to 1.3 mm.

Aspect (50) of this disclosure pertains to the method of any one of Aspects (39) through (49), wherein the first adhesive has a modulus of 1.1 MPa to 10 GPa.

Aspect (51) of this disclosure pertains to the method of any one of Aspects (39) through (50), wherein the first adhesive is not applied in a middle region disposed between the end regions.

Aspect (52) of this disclosure pertains to the method of any one of Aspects (39) through (51), further comprising the step of applying a second adhesive in the middle region.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more than one component or element, and is not intended to be construed as meaning only one.

It will be apparent to those skilled in the art that various modifications and variations can be made without departing from the spirit or scope of the disclosed embodiments. Since modifications, combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. A vehicle interior system, comprising:
a first frame having a first end and a second end;
a second frame having a third end and a fourth end, wherein the third end of the second frame is arranged proximal to the second end of the first frame and wherein the first frame and the second frame define a bending axis between the second end and the third end;
a continuous cover material bonded to the first frame and to the second frame and across the bending axis;
a first display device positioned in a first aperture of the first frame, the first aperture extending through the first frame and opening to opposite sides of the first frame;
wherein the system has a first configuration in which the first frame is substantially planar with the second frame and a second configuration in which the first frame is not substantially planar with the second frame;
an actuator arm coupled to the first frame or the second frame, where the actuator arm is configured to move the first frame or the second frame between the first configuration and the second configuration;
wherein the system is configured to reversibly transition between the first configuration and the second configuration,
wherein, in addition to being connected to one another by the continuous cover material, the second end of the first frame and the third end of the second frame are connected by a pivotable joint at the bending axis when the system is in both the first configuration and the second configuration, wherein the pivotable joint is separate from the cover material, and
wherein, in the second configuration, the second frame forms an angle with the first frame and wherein the angle is in the range that is either: (a) greater than or equal to 90° and less than 180° or (b) greater than 180° to less than 270°, so as to enhance the visibility of the first display device from a particular viewing direction.

2. The vehicle interior system of claim 1, wherein:
the continuous cover material comprises a glass and wherein the glass comprises at least one of a soda lime silicate glass, an aluminosilicate glass, a borosilicate glass, a boroaluminosilicate glass, or an alkali aluminosilicate glass, and the continuous cover material has a thickness of at most 2 mm.

3. The vehicle interior system of claim 1, further comprising a second display device mounted to the second frame.

4. The vehicle interior system of claim 1, wherein a first adhesive bonds the continuous cover material to the first frame and to the second frame and wherein the first adhesive has a modulus of 1.1 MPa to 10 GPa.

5. The vehicle interior system of claim 4, wherein the first adhesive is applied at least at the first end of the first frame and at the fourth end of the second frame.

6. The vehicle interior system of claim 5, wherein a second adhesive is applied over the second end of the first frame and the third end of the second frame.

7. The vehicle interior system of claim 1, wherein the second configuration defines a concave bend or a convex bend in the cover glass.

8. The vehicle interior system of claim 1, wherein the continuous cover material is configured to bend to a radius of curvature of about 60 mm or greater in the second configuration.

9. The vehicle interior system of claim 1, further comprising:
a first actuator arm coupled to the first frame; and
a second actuator arm coupled to the second frame, wherein the first actuator arm or the second actuator arm are configured to move the vehicle interior system between the first configuration and the second configuration.

10. A vehicle interior system, comprising:
a first frame having a first end, a second end, and an aperture that extends through the first frame and opens to opposite sides of the first frame;
a second frame having a third end and a fourth end, wherein the third end of the second frame is connected to the second end of the first to define a bending axis between the second end and the third end;
a continuous cover glass bonded to the first frame and to the second frame and across the bending axis;
wherein the vehicle interior system has a first configuration in which the first frame is substantially planar with the second frame and a second configuration in which the first frame is not substantially planar with the second frame;
an actuator arm coupled to the first frame or the second frame, where the actuator arm is configured to move the first frame or the second frame between the first configuration and the second configuration via one or more of pneumatic actuation, hydraulic actuation, and mechanical linkages to a motor;
wherein the vehicle interior system is configured to reversibly transition between the first configuration and the second configuration,
wherein, in addition to being connected to one another by the continuous cover material, the second end of the first frame and the third end of the second frame are connected by a pivotable joint at the bending axis when the system is in both the first configuration and the second configuration, wherein the pivotable joint is separate from the cover material, and
wherein, in the second configuration, the second frame forms an angle with the first frame and wherein the angle is in the range that either: (a) is greater than or equal to 90° and less than 180° or (b) greater than 180° to less than or equal to 270°, so as to enhance the visibility of a first display device positioned in the first aperture of the first frame from a particular viewing direction.

11. The vehicle interior system of claim 10, wherein:

the continuous cover glass comprises at least one of a soda lime silicate glass, an aluminosilicate glass, a borosilicate glass, a boroaluminosilicate glass, or an alkali aluminosilicate glass, and the continuous cover glass has a thickness of at most 2 mm.

12. The vehicle interior system of claim 10, further comprising a second display device mounted to the second frame.

13. The vehicle interior system of claim 10, wherein a first adhesive bonds the continuous cover glass to the first frame and to the second frame and wherein the first adhesive has a modulus of 1.1 MPa to 10 GPa.

14. The vehicle interior system of claim 13, wherein the first adhesive is applied at least at the first end of the first frame and at the fourth end of the second frame and a second adhesive is applied over the second end of the first frame and a third end of the second frame.

15. The vehicle interior system of claim 10, wherein, in the second configuration, the second frame forms an angle with the first frame and wherein the angle is in the range of 90° to less than 180° or greater than 180° to 270°.

16. The vehicle interior system of claim 10, further comprising:

a first actuator arm coupled to the first frame; and a second actuator arm coupled to the second frame, wherein the first actuator arm or the second actuator arm are configured to move the vehicle interior system between the first configuration and the second configuration.

\* \* \* \* \*